United States Patent [19]

Fletcher

[11] Patent Number: 6,072,797
[45] Date of Patent: Jun. 6, 2000

[54] METHODS, APPARATUS AND COMPUTER PROGRAM PRODUCTS FOR AGGREGATED TRANSMISSION GROUPS IN HIGH SPEED NETWORKS

[75] Inventor: James Corvin Fletcher, Apex, N.C.

[73] Assignee: International Business Machines Corporation, Armonk, N.Y.

[21] Appl. No.: 08/904,132

[22] Filed: Jul. 31, 1997

[51] Int. Cl.[7] ............................. H04L 12/28; H04L 12/56
[52] U.S. Cl. ..................... 370/394; 370/394; 370/351; 370/389; 370/400
[58] Field of Search .................................. 370/351, 400, 370/389, 409, 410, 428, 94, 58, 79, 60, 54, 84, 394

[56] References Cited

U.S. PATENT DOCUMENTS

| | | | |
|---|---|---|---|
| 5,233,604 | 8/1993 | Ahmadi et al. | 370/60 |
| 5,289,462 | 2/1994 | Ahmadi et al. | 370/60.1 |
| 5,317,566 | 5/1994 | Joshi | 370/60 |
| 5,452,294 | 9/1995 | Natarajan | 370/54 |
| 5,477,536 | 12/1995 | Picard | 370/54 |
| 5,654,958 | 8/1997 | Natarajan | 370/410 |

OTHER PUBLICATIONS

Bird, R., Advances in APPN architecture, *IBM Systems Journal*, vol. 34, No. 3, pp. 430–451 (1995).
Huynh, L., et al., Performance Comparison between TCP Slow-start and a New Adaptive Rate–based Congestion Avoidance Scheme, Proceedings of the IEEE International Workshop on Modeling, Analysis, and Simulation of Computer and Telecommunication Systems, pp. 300–307 (1994).
Accunet T1.5 Service Description and Interface Specification, *AT& T Document TR62411*, pp. 7–12 (Dec. 1990).
Rose., O., The Q–bit Scheme—Congestion Avoidance using Rate–Adaption, *Computer Communications Review*, vol. 22, No. 2 (Apr. 1992).
Gerla, M., et al., Flow Control: A Comparative Survey, *IEEE Transactions on Communications*, vol. 28, No. 4, pp. 553–574 (Apr. 1980).
*Systems Network Architecture: APPN Architecture Reference*, IBM Publication No. SC30–3422–04, pp. 1.1–1.48. 3.13–3.15, 7.1–7.114, 10.1–10.50.
Huitema, C, *Routing in the Internet*, pp. 109–111, 147–148, 279–309 (Prentice–Hall 1995).
Tran–Gia, P., et al., Throughput Analysis of a Class of Selective Repeat Protocols in High–Speed Environments, *IBM Research Report No. 1739*, pp. 1–23 (Sep. 1988).
Schwartz, M., Telecommunication Networks: Protocols, Modeling and Analysis, pp. 131–134, 153–156 (Addison–Wesley, 1987).
Traynham, K., et al., Data Link Control and Contemporary Data Links, *IBM Technical Report No. TR–29.0168*, pp. 5–7, 13–16 (Jun. 1977).

*Primary Examiner*—Michael Horabik
*Assistant Examiner*—Man Phan
*Attorney, Agent, or Firm*—Myers Bigel Sibley & Sajovec; Jerry W. Herndon

[57] ABSTRACT

Method, apparatus and computer program products for selecting a routing path in a network from a first endpoint to a second endpoint wherein at least one hop in the routing path from the first endpoint to the second endpoint includes a multi-link transmission group which includes a plurality of transmission paths from a first intermediate node to a second intermediate node. In the selection process, links in the multi-link transmission group are selected by aggregating the characteristics of the plurality of transmission paths in the multi-link transmission group to provide an aggregate transmission group characteristic such that the multi-link transmission group appears as a single link in the routing path. The path from the first endpoint to the second endpoint may then be selected using the aggregate transmission group characteristic. The present invention may be particularly well suited for use in APPN or HPR networks.

21 Claims, 3 Drawing Sheets

METHODS, APPARATUS AND COMPUTER PROGRAM PRODUCTS FOR AGGREGATED TRANSMISSION GROUPS IN HIGH SPEED NETWORKS

FIELD OF THE INVENTION

The present invention relates to communications networks and more particularly to communications networks having multiple parallel concurrent links between two nodes.

BACKGROUND OF THE INVENTION

In recent years there has been a proliferation in the networking of computer systems. The recent expansion of the Internet is just one example of the trend toward distributed computing and information sharing. In most forms of computer or communication networking there are communication paths between the computers in the networks. These paths may include multiple links or hops between intermediate equipment in the path. Thus, a communication may be originated by a first computer and pass through several links before reaching the destination computer. The control over these communications is typically carried out by some form of networking architecture. Many architectures exist for defining communications between computers in a network. For example, System Network Architecture (SNA) and Transfer Control Protocol/Internet Protocol (TCP/IP) are two examples of existing network architectures.

One existing network architecture for controlling communications between computers is known as Advanced Peer to Peer Networking (APPN). APPN, like many networking architectures, is based upon the transmission of data packets where a communication is broken into one or more "packets" of data which are then transmitted from the source to the destination over the communication path. Packet based communications allows for error recovery of less than an entire communication which improves communication reliability and allows for packets to take multiple paths to an end destination thus improving communication availability.

While APPN has proven to be a reliable networking architecture, as computer networking demands have increased there has been created a demand for network architectures which utilize the higher performance communication systems and computer systems currently available. These demands have resulted in the development of High Performance Routing (HPR) which is an enhancement to APPN. The migration from APPN to HPR may be a result of changes in two areas: processing technology and link technology. Processing capability has increased and become less expensive. This has driven the need for larger peer-to-peer networks. Link technology has advanced by several orders of magnitude over the past decade. Advances in wide area links have dramatically increased transmission rates and decreased error rates. Thus, to take advantage of these advances HPR provides high speed data routing which includes end-to-end recovery (i.e. error recovery is performed by the sending and receiving systems) and end-to-end flow and congestion control where the flow of data is controlled by the sending and receiving systems.

HPR consists of two main components: the Rapid Transport Protocol (RTP) and automatic network routing (ANR). RTP is a connection-oriented, full-duplex transport protocol designed to support high speed networks. One feature of RTP is to provide end-to-end error recovery, with optional link level recovery. RTP also provides end-to-end flow/congestion control. Unlike TCP's reactive congestion control, RTP provides an adaptive rate based mechanism (ARB).

In RTP, the ARB mechanism is implemented at the endpoints of an RTP connection. Each endpoint has an ARB sender and an ARB receiver. The ARB sender periodically queries the receiver by sending a rate request to the ARB receiver who responds with a rate reply message. The sender adjusts its send rate based on information received in the rate reply message. Conventionally, RTP discovers the slowest link speed in the path through a connection setup message. The slowest link speed determines the maximum rate (max_send_rate) at which the sender is allowed to send. Each node in the path overwrites the maximum rate field of the setup message if the link speed associated with that node is less than the existing value of the maximum rate field of the packet.

In a conventional link-level recovery HPR path, the receiver initiates error recovery as soon as it detects an out of sequence packet by sending a gap detect message that identifies the packets that need to be resent. When the sender receives a gap detect message, it drops its send rate by 50%. and resends the packets at the next send opportunity. If the sender does not get a response to a rate request within a time-out period (a typical value for a rate request time-out is 4 times the current round trip time), the sender assumes the packet is lost and cuts the send rate by half, increases the rate request time-out exponentially (exponential back off), and transmits a rate request at the next send opportunity.

Because RTP provides end-to-end flow control, the send rate of packets on a path may be limited by the slowest link in the path as described above. Thus, despite a path having high-speed links in the path if a single low-speed link is present, the sender and receiver will pace the transmission of packets to accommodate the low speed link. Thus, a congestion problem or the presence of one low speed link in a path may degrade the throughput for the entire path.

Previous attempts to overcome the bottleneck problem have included providing multiple parallel paths between endpoints, thus limiting the path between endpoints to a single hop. However such a solution may be limited in its applicability to many modern networking systems which may have many hops between endpoints. Furthermore, in systems which allowed for multiple parallel paths between endpoints of an intermediate path in a routing path, these systems typically re-sequenced the packets at the intermediate endpoints of the multiple link hop. This re-sequencing, however, may limit the ability to have a single session distributed across different links in the multiple links. Such re-sequencing also may reduce the throughput of faster links of the multiple links to the throughput of the slowest link in the group as the packets received from the fast links would wait for packets from the slower links before being sent on from the intermediate endpoint.

In light of the above discussion, a need exists for improvement in routing path selection and management in network systems having multiple parallel routing paths.

SUMMARY OF THE INVENTION

In view of the above discussion, it is an object of the present invention to provide for differing transmission rates on a communications path to overcome bottle-necks in a routing path.

Another object of the present invention is to provide for increases or decreases in the required transmission rates of links in a routing path.

Still another object of the present invention is to provide for errors and error recovery in links in a routing path.

Yet another object of the present invention is to provide transmission groups which are transparent to a routing layer of a network protocol.

These and other objects of the present invention are provided by methods, systems and computer program products which provide for multiple links between connection points in a routing path. These connection points may be the bottle-neck in the path. The multiple links may be provided by concurrent links between intermediate points in a routing path to provide a Multilink Transmission Group (MLTG). MLTGs provide increased bandwidth which may be added or deleted incrementally on demand. Furthermore, the combined full bandwidth is available to a session since session traffic can flow over all sublinks in the group. MLTGs also provide increased availability and an individual sublink failure (assuming more than one link in the MLTG) is transparent to sessions using the MLTG.

In a particular embodiment of the present invention, a routing path in a network from a first endpoint to a second endpoint is selected wherein at least one hop in the routing path from the first endpoint to the second endpoint includes a multi-link transmission group which includes a plurality of transmission paths from a first intermediate node to a second intermediate node. In the selection process, links in the multi-link transmission group are selected by aggregating the characteristics of the plurality of transmission paths in the multi-link transmission group to provide an aggregate transmission group characteristic such that the multi-link transmission group appears as a single link in the routing path. The path from the first endpoint to the second endpoint may then be selected using the aggregate transmission group characteristic.

To aggregate the characteristics of a multi-link transmission group the individual links in the multi-link transmission group are identified to the first intermediate endpoint and the second intermediate endpoint as they are activated. A single label is assigned to identify all of the active connections of the multi-link transmission group. The characteristics of the active links in the multi-link transmission group are then aggregated to provide an aggregate characteristic associated with the single label of the multi-link transmission group.

Furthermore, when a link in the multi-link transmission group becomes unavailable the link is also identified to the first intermediate node and the second intermediate node. The aggregate characteristic of the multi-link transmission may then be based upon the remaining links in the transmission group to provide an updated aggregate characteristic. The single label may also be updated to reflect the updated aggregate characteristic of the multi-link transmission group.

When the path between the first endpoint and the second endpoint is a HPR routing path having a topology management layer, then the topology management layer is notified of the aggregate characteristic of the multi-link transmission group such that the multi-link transmission group appears as a single link between the intermediate endpoints. The topology management layer may be notified each time a link is activated or unavailable. This notification may be carried out by sending an APPN Topology Update.

By utilizing a dynamically updated aggregate characteristic associated with a MLTG, the MLTG presence may be transparent to path selection. Furthermore, as the characteristics of the MLTG change they may be factored into path selection such that the MLTG may be selected or not based upon the aggregate characteristic rather than the individual characteristics of the MLTG.

In an embodiment of the present invention where data packets are transmitted from the first endpoint node to the second endpoint node over a routing path which includes a multi-link transmission group, then out of sequence data packets received at a receiving one of the first and second endpoint nodes are resequenced so as to provide the data packets in an original data packet sequence.

In another embodiment of the present invention, data packets are transferred over an HPR routing path between a first RTP endpoint and a second RTP endpoint. The routing path contains at least one hop which includes a plurality of parallel links between a first hop endpoint and a second hop endpoint. Out of sequence data packets received at a receiving one of the first and the second RTP endpoint nodes are resequenced by the receiving one of the RTP endpoint nodes so as to provide the data packets in an original data packet sequence. In such an embodiment, the sequence timing constraints of intermediate hop nodes in the HPR routing path may be relaxed to allow out of sequence data packets to be transmitted between the intermediate nodes without causing an error.

Furthermore, preferably at least one intermediate node between the RTP endpoints receives data packets from a first communication link and transmits the received data packets on a second communication link in the order received from the first communication link. The RTP endpoints may also determine if a packet was not received by the receiving RTP endpoint and initiate error recovery if a packet was not received.

By delaying the resequencing of data packets until the RTP endpoints, the present invention allows the full bandwidth of a MLTG to be realized because the intermediate endpoints of the MLTG do not have to wait for slower links in the group to transmit packets before forwarding on received data packets. Furthermore, because the resequencing is done at the RTP endpoint nodes the presence of an MLTG in a routing path may be made transparent to nodes outside the RTP endpoints in a non-homogeneous network.

As will further be appreciated by those of skill in the art, the present invention may be embodied as a method, apparatus/system or computer program product.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

Figure 1:
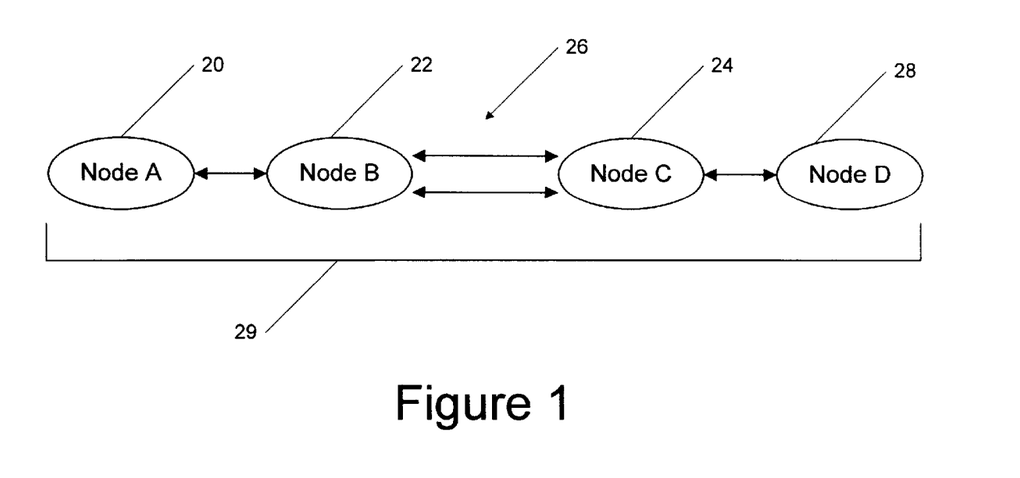
FIG. 1 is a block diagram of a network according to the present invention.

FIG. 1 is a block diagram illustrating a network communication path utilizing the present invention. As seen in FIG. 1, a first endpoint node is connected to an intermediate node 22. The intermediate node 22 is connected to a second intermediate node 24 by a multilink transmission group 26 (MLTG). Intermediate node 24 is then connected to a second endpoint node 28. The endpoint nodes are preferably RTP endpoint nodes. The path from the first endpoint node 20 to the second endpoint node 28 is preferably an HPR routing path.

A transmission group is a logical group of one or more links between adjacent nodes that appears as a single path to the routing layer. A MLTG is a transmission group that includes more than one link. Links in a MLTG are referred to herein as sublinks. An MLTG can include any combination of link types (e.g., token ring, SDLC, frame relay, etc.). For purposes of illustration, the MLTG 26 has two links, however, as will be appreciated by those of skill in the art, the principles of the present invention may apply to any number of parallel concurrent paths between two nodes.

Communications flow across the network from endpoint node to endpoint node in either direction. However, for purposes of illustration, communications will be described as originating with the first endpoint node 20 and being received by the second endpoint node 28. Thus, an example of a communication flow would be for the first endpoint node 20 to send communication packets to the first intermediate node 22. The first intermediate node then distributes the communication packets among the links of the MLTG 26 and transmits the packets to the second intermediate node 24. The second intermediate node 24 receives the packets from the first intermediate node 22 and sends them on to the second endpoint 28.

As will be appreciated by those of skill in the art, packets transmitted from RTP nodes are typically transmitted in a sequence such that each packet has associated with it a sequence number. Thus, packets transmitted from endpoint node 20 will have a sequence number associated with each packet indicating the packet's location in a communication sequence. The packets will remain in sequence as they are transmitted from node to node in the hops of the routing path until the packets reach an MLTG. This is because packets are transmitted from node to node across a single link between the nodes in a first-in-first-out sequence. Thus, the sequence of the packets is maintained throughout the nodes.

However, when the packets reach the MLTG 26, the packets may be divided between the links in the MLTG 26 and, through this division, may arrive at intermediate node 24 out of sequence. This loss of sequencing may result from any number of situations including differing transmission rates for the links in the MLTG 26, differing queuing delays for the links or errors occurring on a link. Whatever the reason for the packets being received out of sequence, according to the present invention, these out of sequence packets are transmitted from intermediate node 24 to endpoint node 28 in a first-in-first-out fashion. Thus, packets may be received by endpoint node 28 out of sequence.

In traditional HPR without MLTGs in a routing path, endpoint nodes may detect an error by detecting out of sequence packets as discussed above. When a packet is received out of sequence, the receiving node assumes that a packet has been lost and requests that packet be retransmitted. However, according to the present invention, the receiving node does not cause an error condition if packets are transmitted out of sequence but transmits the packets it receives on to the next node in the path. Packets are then re-sequenced at the RTP endpoints 20 and 28 which would then provide end-to-end error recovery of lost packets. This deferral of re-sequencing allows each of the links in the transmission group to operate at its maximum throughput. Accordingly, the transmission rate of the MLTG will be the aggregate of the transmission rates of the links in the group. Thus, the present invention overcomes the limitations of prior multiple link paths by deferring the sequencing of packets until the endpoints of the path.

In an HPR implementation of the present invention which may provide link level error recovery, packets flowing over an MLTG can arrive at an RTP endpoint out of sequence. RTP is informed if an MLTG is in a path at connection establishment. If an MLTG is not in the path, any data received that is out of sequence may cause error recovery (i.e., the receiver sends a gap detect message to the sender). If an MLTG is in the path, error recovery is delayed. When the receiver detects out of sequence packets, it initiates a time-out procedure before sending the gap detect message. The time-out procedure allows enough time for all packets to arrive before initiating recovery. By waiting for out of sequence packets before initiating error recovery, the links in a path may accommodate out of sequence packets while still providing link-level error recovery.

Thus, in setting up an HPR routing path, such as routing path 29, a conventional path setup procedure may be modified to implement the present invention. Thus, for example, an ANR label string may be returned on the Route Setup for HPR that indicates an MLTG is to be used. When the route setup traverses an MLTG, an MLTG indicator is set within the Route Setup. This indicator tells the nodes in the routing path that out of sequence packets may be accepted without causing an error condition.

The addition of an MLTG to a path also requires the endpoints of the MLTG to schedule packets to the sublinks of the MLTG. This distribution of packets among the concurrent links may be accomplished in a number of ways, including round-robin, weighted round-robin and link metered pacing approaches.

As will be appreciated by those of skill in the art, the RTP endpoints, 20 and 28 may themselves be intermediate nodes in a path which includes HPR portions of the path and non-HPR portions of the path. Furthermore, there may be more than one MLTG in a routing path. Also, the number of links in the MLTG may dynamically change such that links are added or subtracted from the MLTG over time. This change in the number of links in the MLTG may result from increased performance demands, failures and/or restoration of links, consideration of cost of usage of a link or any number of other reasons which would cause a link to be unavailable or unused.

The routing path 29 illustrated in FIG. 1, may be selected from a number of different potential routing paths based upon, for example, class of service (COS) of the hops in the path. In such a selection process, the MLTG 26 may be viewed as a single group having characteristics which are an aggregate of the characteristics of the links in the group. Thus, for example, an aggregate COS of the MLTG 26 may be used in path selection by HPR or other routing schemes.

Furthermore, in routing systems which use a packet transmission pacing system, the rate at which packets are provided to a routing path may be dependent on the performance characteristics of the links in the routing path. Thus, for example, in the adaptive rate based routing algorithm of HPR the maximum throughput of a link is used to establish the send rate of the packets. According to the present invention, the throughput of the MLTG is the aggregate throughput of the links in the MLTG. Also, as the throughput of the MLTG changes by adding or subtracting links this information is provided to the endpoints and may be considered in establishing the send rate of the routing path. Thus, the present invention provides for dynamically updating the characteristics of an MLTG to a routing layer in a network protocol.

Figure 1A:
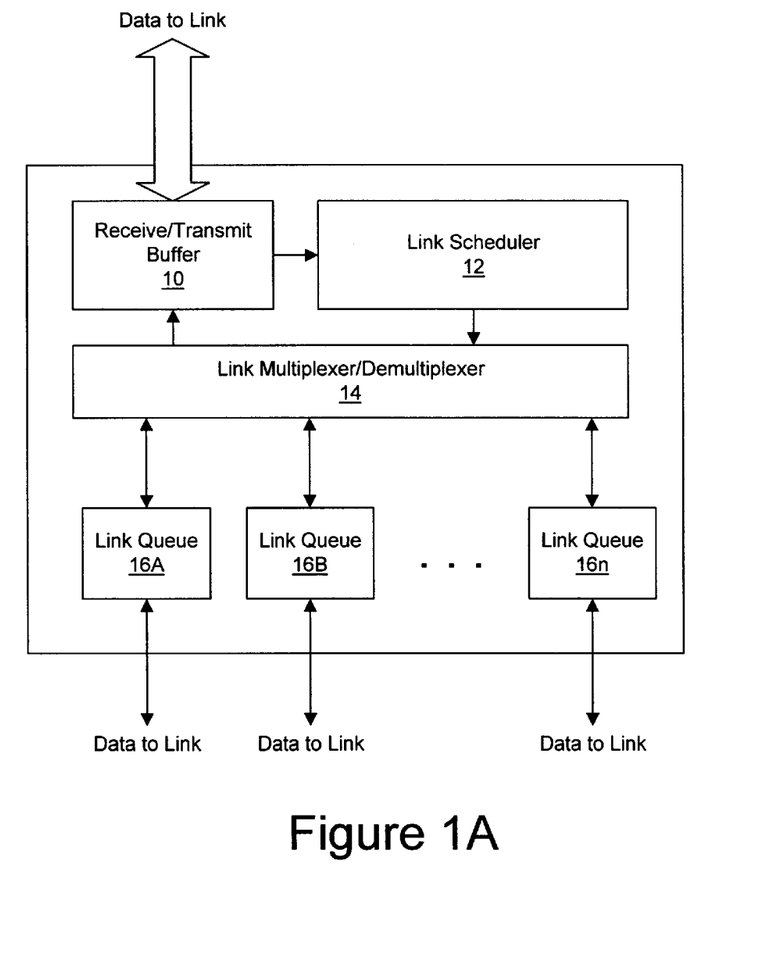
FIG. 1A is a block diagram of a representative node according to the present invention.

A representative node according to the present invention is illustrated in FIG. 1A. The node in FIG. 1A may be implemented in hardware, software or a combination of hardware and software. Furthermore, the node may be implemented using a general purpose processing system such as a computer or dedicated routing hardware such as a router or other networking device. Accordingly, the present description of a node according to the present invention is not intended to limit the present invention to a particular implementation but is provide to better understand the nature of the present invention.

As seen in FIG. 1A, a node, such as Node B 22 or Node C 24 may include a buffer 10 for receiving and transmitting data onto the single communication link. When data is received from the single link side of the node the data is provided to a scheduler 12 which distributes data across the links in the MLTG. The scheduler 12 may also manage the links of the MLTG to generate and provide the aggregate characteristics of the MLTG links as described herein. Furthermore, in implementations with dynamic reconfiguration of the MLTG, the scheduler 12 may monitor link usage and add or subtract links from the MLTG as needed.

The scheduler may provide the data to link queues 16A, 16B to 16n where n is the number of links in the MLTG, through a multiplexer/demultiplexer 14. The data is multiplexed to the link queues according to a scheduling algorithm which may be any suitable algorithm such as a round-robin algorithm. Alternatively a predefined usage could be set by a user to, for example, use low cost links until higher cost links were needed. Data multiplexed to the link queues is transmitted over the links in the MLTG to the other endpoint node of the MLTG.

Data received from the links of the MLTG is received into the link queues 16A, 16B to 16n and then demultiplexed by the multiplexer/demultiplexer 14 and provided to the buffer 10 for transmission on the single link.

Figure 2:
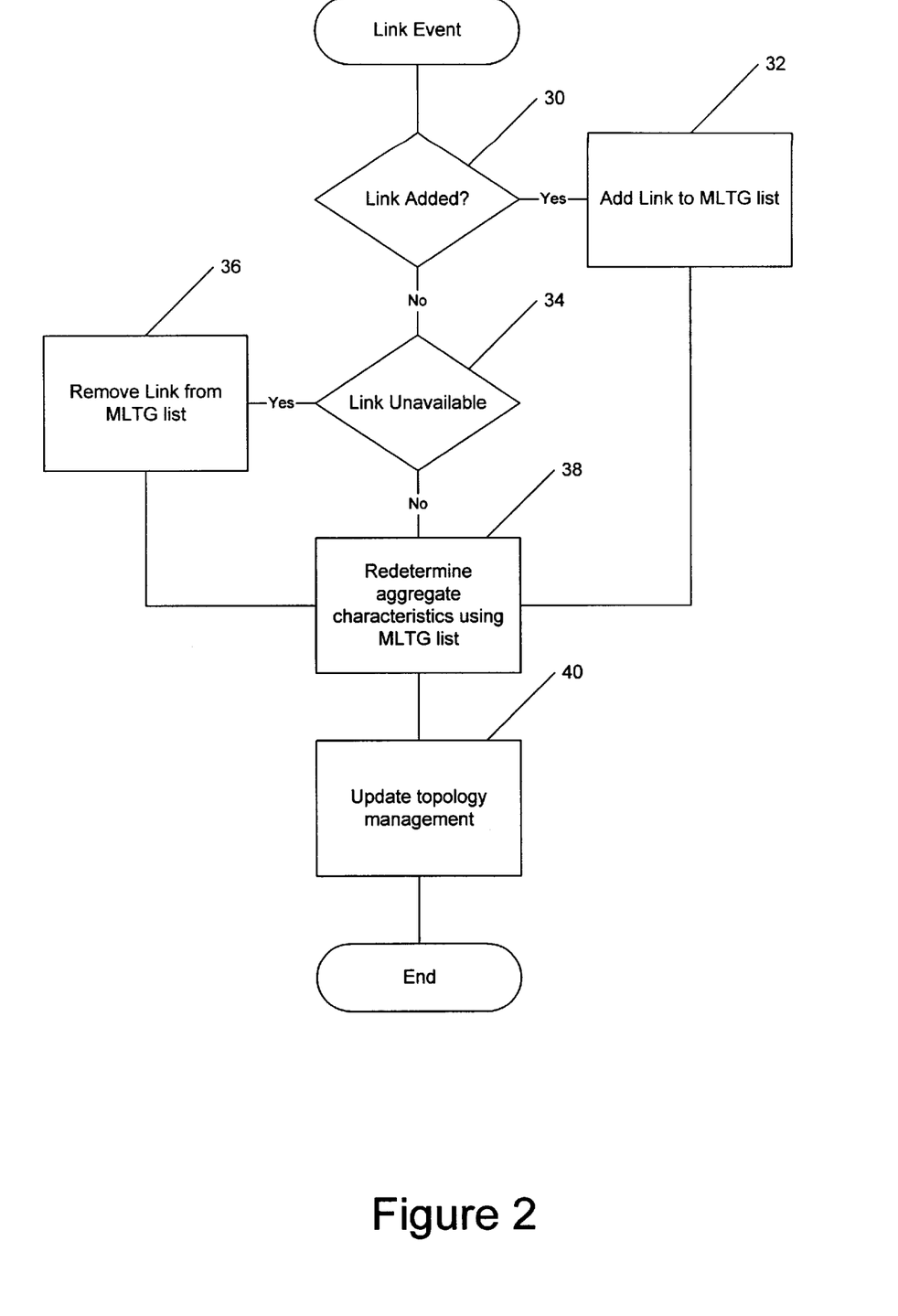
FIG. 2 is a flow chart illustrating the management of a multiple link transmission group according to the present invention.
Figure 3:
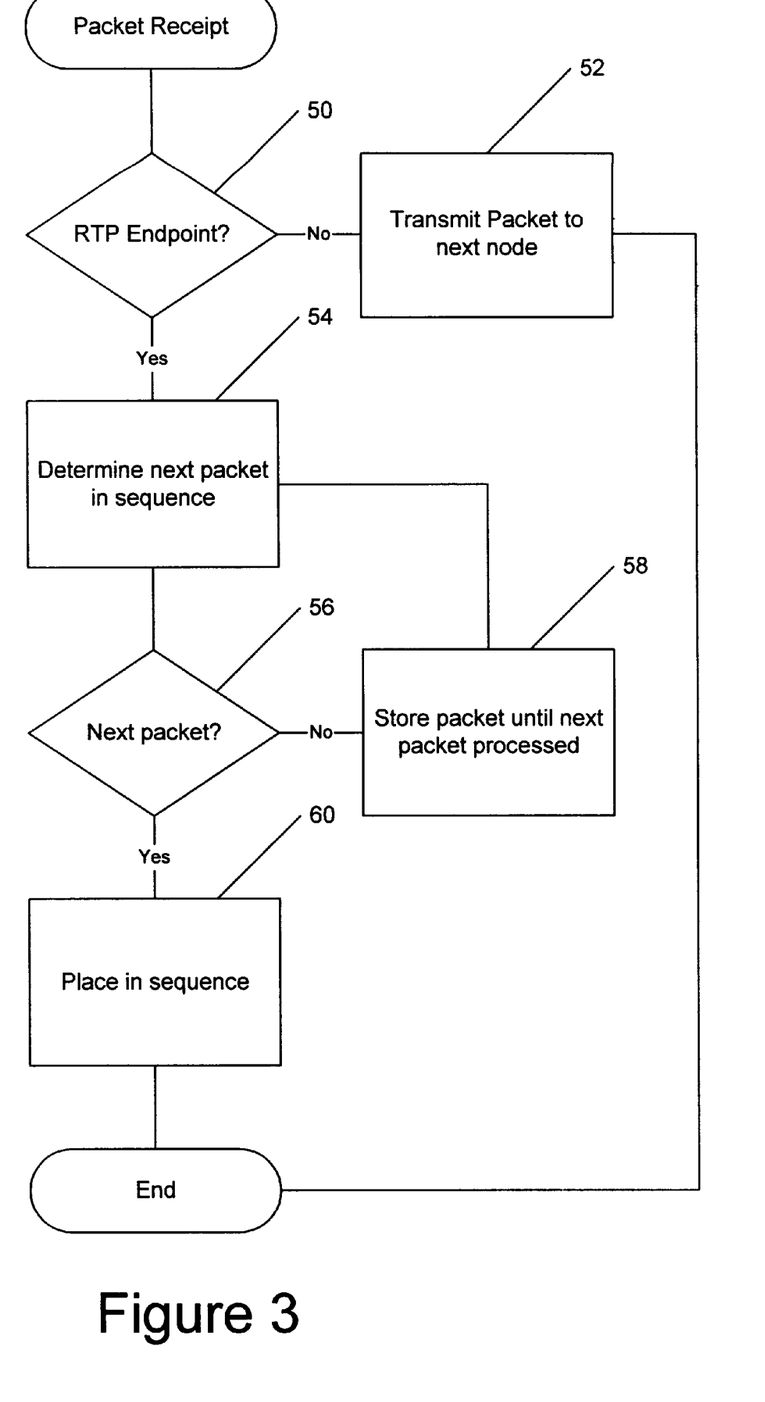
FIG. 3 is a flow chart illustrating the operation of a node in a routing path according to the present invention.

Particular aspects of the present invention are illustrated in FIG. 2 and FIG. 3. FIG. 2 illustrates the dynamic operation of an origin MLTG endpoint according to the present invention. FIG. 3 illustrates the operations of re-sequencing of data packets by an RTP endpoint according to the present invention.

The present invention will now be described with respect to FIGS. 2 and 3 which are flowchart illustrations of one embodiment of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

FIG. 2 illustrates the operations of an endpoint of a MLTG such as nodes 22 and 24. As seen in FIG. 2, when a link event occurs, such as the addition of a new link to the MLTG, the removal of a link from the MLTG, the failure of an MLTG link or the restoration of an MLTG link, the endpoints determine if an additional link is available (block 30). If an additional link is added, the link is added to the MLTG list of links in the MLTG (block 32). However, if a link is not added then it is determined if the event was the removal of a link from the MLTG (block 34). If a link is removed from the MLTG then that links reference in the MLTG list of links in the MLTG is removed (block 36).

After making the proper updates to the list of links in the MLTG list, the list may be used to determine the aggregate characteristics of the MLTG (block 38). These aggregate characteristics may be total bandwidth or the links in the group, average queuing delay, or other characteristics of the links in the MLTG as a group rather than individually. As will be appreciated by those of skill in the art, the characteristics of the MLTG may be established in differing ways depending on the nature of the characteristic and the use of that characteristic. For example, in an HPR system, the aggregate characteristics which are determined for the MLTG may include link speed which may be summed or propagation delay which may utilize the longest delay.

After determining the aggregate characteristics of the MLTG, these characteristics are provided to the topology management of the routing layer (block 40). In an HPR implementation of the present invention, such an update of topology management may be accomplished by the endpoints of the MLTG sending an APPN Topology Update (TDU). If the last link in a MLTG is inactivated then a TDU would be sent to indicate that the link is no longer available.

FIG. 3 illustrates the packet handling of nodes in the routing path according to the present invention. This procedure may be utilized by both intermediate and RTP endpoint nodes, such as endpoints 20 and 28, with one or more MLTGs in the routing path. The present illustration is for nodes not utilizing link-level error recovery. As seen in FIG. 3, when a packet is received by a node, if the node is not an RTP endpoint (block 50) then the data is simply forwarded to the next node without re-sequencing (block 52). However, if the node is an RTP endpoint node, then the next expected packet in the sequence is determined (block 54) and the arriving packet is checked to see if it is the next packet in the sequence (block 56). If the packet is the next packet in the sequence then it is placed in sequence (block 60). However, if it is not the next block in the sequence, then the packet is stored until the next packet has been processed and then rechecked to see if it now fits in sequence (block 58). This operation continues until the packet is fit into the sequence.

To maintain end-to-end error recovery, out of sequence packets could be checked a finite number of times or for a finite time period and, if not fit into the sequence then it would be assumed that packets had been lost. Upon detection of a lost packet, a standard retransmission procedure could be initiated. Furthermore, while the intermediate node operation illustrated in FIG. 3 has been to pass along packets without checking for sequence, some degree of link level error recovery could be maintained by monitoring packet sequence without re-sequencing the packets. In such a case, the intermediate links could detect missing packets by keeping track of the sequence numbers of received packets and carrying out error recovery if all the packets in the sequence are not received within a specified time period or number of packets.

As used herein, the term node refers to the hardware endpoints of a communication link. Thus, for example, a node could be a computer system, a router, an ATM switch or other such networking hardware as would be understood by those of skill in the art to provide a data packet routing function.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of selecting a routing path in a network from a first endpoint to a second endpoint and wherein at least one hop in a routing path from the first endpoint to the second endpoint includes a multi-link transmission group which includes a plurality of transmission paths from a first intermediate node to a second intermediate node, the method comprising:

aggregating the characteristics of the plurality of transmission paths in the multi-link transmission group to provide an aggregate transmission group characteristic such that the multi-link transmission group appears as a single link in the routing path; and selecting the path from the first endpoint to the second endpoint based upon the aggregate transmission group characteristic.

2. A method of selecting a routing path in a network from a first endpoint to a second endpoint wherein at least one hop in a routing path from the first endpoint to the second endpoint includes a multi-link transmission group which includes a plurality of transmission paths from a first intermediate node to a second intermediate node, the method comprising:

aggregating the characteristics of the plurality of transmission paths in the multi-link transmission group to provide an aggregate transmission group characteristic such that the multi-link transmission group appears as a single link in the routing path, the aggregating step comprising the steps of:

identifying to the first intermediate endpoint and the second intermediate endpoint the individual links in the multi-link transmission group as they are activated;

assigning a single label to identify all of the active connections of the multi-link transmission group; and aggregating the characteristics of the active links in the multi-link transmission group to provide an aggregate characteristic associated with the single label of the multi-link transmission group; and selecting the path from the first endpoint to the second endpoint based upon the aggregate transmission group characteristic.

3. The method according to claim 2, further comprising the steps of:

identifying to the first intermediate node and the second intermediate node when a link in the multi-link transmission group becomes unavailable;

determining the aggregate characteristic of the multi-link transmission group based upon the remaining links in the transmission group to provide an updated aggregated characteristic; and updating the single label to associate the updated aggregate characteristic of the multi-link transmission group.

4. The method according to claim 3, wherein said path between the first endpoint and the second endpoint comprises a HPR routing path having a topology management layer, said method further comprising:

notifying the topology management layer of the aggregate characteristic of the multi-link transmission group such that the multi-link transmission group appears as a single link between the intermediate endpoints.

5. The method according to claim 4, wherein said notifying step is carried out each time a link is activated or unavailable.

6. The method according to claim 5, wherein said notifying step comprises the step of sending an APPN Topology Update.

7. A method of selecting a routing path in a network from a first endpoint to a second endpoint wherein at least one hop in a routing path from the first endpoint to the second endpoint includes a multi-link transmission group which includes a plurality of transmission paths from a first intermediate node to a second intermediate node, and wherein data packets are transmitted from the first endpoint node to the second endpoint node over a routing path which includes a multi-link transmission group, the method comprising the steps of:

aggregating the characteristics of the plurality of transmission paths in the multi-link transmission group to provide an aggregate transmission group characteristic such that the multi-link transmission group appears as a single link in the routing path;

selecting the path from the first endpoint to the second endpoint based upon the aggregate transmission group characteristic; and resequencing out of sequence data packets received at a receiving one of said first and said second endpoint nodes so as to provide the data packets in an original data packet sequence.

8. An apparatus for selecting a routing path in a network from a first endpoint to a second endpoint and wherein at least one hop in a routing path from the first endpoint to the second endpoint includes a multi-link transmission group which includes a plurality of transmission paths from a first intermediate node to a second intermediate node comprising:

means for aggregating the characteristics of the plurality of transmission paths in the multi-link transmission group to provide an aggregate transmission group characteristic such that the multi-link transmission group appears as a single link in the routing path; and means for selecting the path from the first endpoint to the second endpoint based upon the aggregate transmission group characteristic.

9. A computer program product for selecting a routing path in a network from a first endpoint to a second endpoint and wherein at least one hop in a routing path from the first endpoint to the second endpoint includes a multi-link transmission group which includes a plurality of transmission paths from a first intermediate node to a second intermediate node, the computer program product comprising:

a computer-readable storage medium having computer-readable program code means embodied in said medium, said computer-readable program code means comprising:

computer-readable program code means for aggregating the characteristics of the plurality of transmission paths in the multi-link transmission group to provide an aggregate transmission group characteristic such that the multi-link transmission group appears as a single link in the routing path; and computer-readable program code means for selecting the path from the first endpoint to the second endpoint based upon the aggregate transmission group characteristic.

10. An apparatus for selecting a routing path in a network from a first endpoint to a second endpoint wherein at least one hop in a routing path from the first endpoint to the second endpoint includes a multi-link transmission group which includes a plurality of transmission paths from a first intermediate node to a second intermediate node, comprising:

means for aggregating the characteristics of the plurality of transmission paths in the multi-link transmission group to provide an aggregate transmission group characteristic such that the multi-link transmission group appears as a single link in the routing path, the means for aggregating comprising:

means for identifying to the first intermediate endpoint and the second intermediate endpoint the individual links in the multi-link transmission group as they are activated;

means for assigning a single label to identify all of the active connections of the multi-link transmission group; and means for aggregating the characteristics of the active links in the multi-link transmission group to provide an aggregate characteristic associated with the single label of the multi-link transmission group; and means for selecting the path from the first endpoint to the second endpoint based upon the aggregate transmission group characteristic.

11. An apparatus according to claim 10, further comprising:

means for identifying to the first intermediate node and the second intermediate node when a link in the multi-link transmission group becomes unavailable;

means for determining the aggregate characteristic of the multi-link transmission group based upon the remaining links in the transmission group to provide an updated aggregate characteristic; and means for updating the single label to associate the updated aggregate characteristic of the multi-link transmission group.

12. An apparatus according to claim 11, wherein said path between the first endpoint and the second endpoint comprises a HPR routing path having a topology management layer, said apparatus further comprising:

means for notifying the topology management layer of the aggregate characteristic of the multi-link transmission group such that the multi-link transmission group appears as a single link between the intermediate endpoints.

13. An apparatus according to claim 12, wherein said means for notifying is invoked each time a link is activated or unavailable.

14. An apparatus according to claim 13, wherein said means for notifying comprises means for sending an APPN Topology Update.

15. An apparatus for selecting a routing path in a network from a first endpoint to a second endpoint wherein at least one hop in a routing path from the first endpoint to the second endpoint includes a multi-link transmission group which includes a plurality of transmission paths from a first intermediate node to a second intermediate node, and wherein data packets are transmitted from the first endpoint node to the second endpoint node over a routing path which includes a multi-link transmission group, comprising:

means for aggregating the characteristics of the plurality of transmission paths in the multi-link transmission group to provide an aggregate transmission group characteristic such that the multi-link transmission group appears as a single link in the routing path;

means for selecting the path from the first endpoint to the second endpoint based upon the aggregate transmission group characteristic; and means for resequencing out of sequence data packets received at a receiving one of said first and said second endpoint nodes so as to provide the data packets in an original data packet sequence.

16. A computer program product for selecting a routing path in a network from a first endpoint to a second endpoint wherein at least one hop in a routing path from the first endpoint to the second endpoint includes a multi-link transmission group which includes a plurality of transmission paths from a first intermediate node to a second intermediate node, the computer program product comprising:

a computer-readable storage medium having computer-readable program code means embodied in the medium, the computer-readable program code means comprising:

computer-readable program code means for aggregating the characteristics of the plurality of transmission paths in the multi-link transmission group to provide an aggregate transmission group characteristic such that the multi-link transmission group appears as a single link in the routing path, the computer-readable program code means for aggregating comprising:

computer-readable program code means for identifying to the first intermediate endpoint and the second intermediate endpoint the individual links in the multi-link transmission group as they are activated;

computer-readable program code means for assigning a single label to identify all of the active connections of the multi-link transmission group; and computer-readable program code means for aggregating the characteristics of the active links in the multi-link transmission group to provide an aggregate characteristic associated with the single label of the multi-link transmission group; and computer-readable program code means for selecting the path from the first endpoint to the second endpoint based upon the aggregate transmission group characteristic.

17. A computer program product according to claim 16, further comprising:

computer-readable program code means for identifying to the first intermediate node and the second intermediate node when a link in the multi-link transmission group becomes unavailable;

computer-readable program code means for determining the aggregate characteristic of the multi-link transmission group based upon the remaining links in the transmission group to provide an updated aggregate characteristic; and computer-readable program code means for updating the single label to associate the updated aggregate characteristic of the multi-link transmission group.

18. A computer program product according to claim 17, wherein said path between the first endpoint and the second endpoint comprises a HPR routing path having a topology management layer, said computer-readable program code means further comprising:

computer-readable program code means for notifying the topology management layer of the aggregate characteristic of the multi-link transmission group such that the multi-link transmission group appears as a single link between the intermediate endpoints.

19. A computer program product according to claim 18, wherein said computer-readable program code means for notifying is executed each time a link is activated or unavailable.

20. A computer program product according to claim 19, wherein said computer-readable program code means for notifying comprises computer-readable program code means for sending an APPN Topology Update.

21. A computer program product for selecting a routing path in a network from a first endpoint to a second endpoint wherein at least one hop in a routing path from the first endpoint to the second endpoint includes a multi-link transmission group which includes a plurality of transmission paths from a first intermediate node to a second intermediate node, and wherein data packets are transmitted from the first endpoint node to the second endpoint node over a routing path which includes a multi-link transmission group, the computer program product comprising:

a computer-readable storage medium having computer-readable program code means embodied in the medium, the computer-readable program code means comprising:

computer-readable program code means for aggregating the characteristics of the plurality of transmission paths in the multi-link transmission group to provide an aggregate transmission group characteristic such that the multi-link transmission group appears as a single link in the routing path;

computer-readable program code means for selecting the path from the first endpoint to the second endpoint based upon the aggregate transmission group characteristic; and computer-readable program code means for resequencing out of sequence data packets received at a receiving one of said first and said second endpoint nodes so as to provide the data packets in an original data packet sequence.

* * * * *